United States Patent
Yamamoto et al.

(10) Patent No.: US 11,865,626 B2
(45) Date of Patent: Jan. 9, 2024

(54) DRILL

(71) Applicant: OSG CORPORATION, Toyokawa (JP)

(72) Inventors: Takahiro Yamamoto, Toyokawa (JP); Hiroyasu Makino, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 0 days.

(21) Appl. No.: 17/044,445

(22) PCT Filed: Aug. 30, 2019

(86) PCT No.: PCT/JP2019/034179
§ 371 (c)(1),
(2) Date: Oct. 1, 2020

(87) PCT Pub. No.: WO2021/038841
PCT Pub. Date: Mar. 4, 2021

(65) Prior Publication Data
US 2021/0229190 A1 Jul. 29, 2021

(51) Int. Cl.
*B23B 51/02* (2006.01)
(52) U.S. Cl.
CPC .......... *B23B 51/02* (2013.01); *B23B 2251/04* (2013.01); *B23B 2251/08* (2013.01); *B23B 2251/14* (2013.01)
(58) Field of Classification Search
CPC . B23B 51/02; B23B 2251/04; B23B 2251/08; B23B 2251/14; B23B 2251/082; B23B 2251/18
See application file for complete search history.

(56) References Cited

U.S. PATENT DOCUMENTS 5,112,167 A * 5/1992 Shiga .................... B23B 51/00
408/211
5,846,035 A * 12/1998 Karafillis ............... B23B 51/02
408/1 R (Continued)

FOREIGN PATENT DOCUMENTS

| CN | 101574745 A | 11/2009 |
| CN | 102458740 A | 5/2012 |

(Continued)

OTHER PUBLICATIONS

Written Opinion of the International Searching Authority of International Application No. PCT/JP2019/034179 dated Oct. 29, 2019 and English translation thereof.

(Continued)

*Primary Examiner* — Alan Snyder
*Assistant Examiner* — Reinaldo A Vargas Del Rio
(74) *Attorney, Agent, or Firm* — Muncy, Geissler, Olds & Lowe, P.C.

(57) ABSTRACT

A three-flute drill includes a body, discharge grooves, cutting edges, thinning edges and gash portions. The discharge grooves are provided in an outer peripheral surface of the body. The cutting edges are provided on ridge sections between inner faces of the discharge grooves and flanks of the body. The thinning edge extends from an end of the cutting edge toward a radially inner side. The gash portion includes an R portion and a straight portion. A first ridge line between the R portion and the flank extends while curving toward a rotation direction, from an end of the thinning edge toward a radially outer side. A second ridge line between the straight portion and the flank extends linearly from an end of the first ridge line toward the radially outer side, and connects to the discharge groove further to the radially inner side than the outer peripheral surface.

7 Claims, 16 Drawing Sheets

(56) References Cited

U.S. PATENT DOCUMENTS

| | | | |
|---|---|---|---|
| 6,916,139 B2* | 7/2005 | Yanagida | B23B 51/02 408/230 |
| 8,342,781 B2 | 1/2013 | Soittu | |
| 8,382,404 B2* | 2/2013 | Masuda | B23B 51/02 408/230 |
| 8,801,344 B2* | 8/2014 | Krenzer | B23B 51/02 408/230 |
| 8,814,483 B2* | 8/2014 | Harouche | B23B 51/02 408/230 |
| 10,421,131 B2* | 9/2019 | Park | B23B 51/02 |
| 10,471,522 B2* | 11/2019 | Yamamoto | B23B 51/06 |
| 10,646,934 B2* | 5/2020 | Tsutsumi | B23B 51/02 |
| 2009/0279965 A1 | 11/2009 | Soittu | |
| 2011/0085868 A1 | 4/2011 | Harouche | |
| 2012/0076597 A1 | 3/2012 | Krenzer et al. | |
| 2014/0294529 A1 | 10/2014 | Takai | |
| 2016/0144436 A1 | 5/2016 | Kuroda | |
| 2017/0232529 A1 | 8/2017 | Kawakami et al. | |
| 2018/0236568 A1 | 8/2018 | Yamamoto et al. | |
| 2018/0243841 A1* | 8/2018 | Nakanohara | B23B 51/02 |
| 2019/0232392 A1 | 8/2019 | Tsutsumi | |
| 2020/0282472 A1 | 9/2020 | Yamamoto | |

FOREIGN PATENT DOCUMENTS

| | | | |
|---|---|---|---|
| CN | 102574217 A | 7/2012 | |
| CN | 107921553 A | 4/2018 | |
| CN | 109641289 A | 4/2019 | |
| DE | 19602566 A1 | 7/1997 | |
| DE | 102009025223 A1 * | 12/2010 | B23B 51/02 |
| DE | 102013226697 A1 * | 6/2015 | B23B 51/02 |
| JP | H5-29615 U | 4/1993 | |
| JP | H7-308814 A | 11/1995 | |
| JP | H10-058291 A | 3/1998 | |
| JP | 2006-281407 A | 10/2006 | |
| JP | 2009-148865 A | 7/2009 | |
| JP | 2015-131384 A | 7/2015 | |
| JP | 2016-59999 A | 4/2016 | |
| JP | 2017-42879 A | 3/2017 | |
| JP | 2017-164836 A | 9/2017 | |
| WO | WO-2008001412 A1 * | 1/2008 | B23B 51/02 |
| WO | 2013/065201 A1 | 5/2013 | |
| WO | 2014/208421 A1 | 12/2014 | |
| WO | 2019/049257 A1 | 3/2019 | |
| WO | 2019/088013 A1 | 5/2019 | |

OTHER PUBLICATIONS

Notification of Reasons for Rejection of the corresponding JP application No. 2020-562786 dated Sep. 21, 2021 and English translation thereof.

Office action for the corresponding Korean application No. 10-2020-7037908 dated May 30, 2022 and English ranslation thereof.

The extended European Search Report for the corresponding application No. 19942824.4 dated Apr. 24, 2023.

Office Action of the corresponding CN application No. 201980042638.2 dated Aug. 31, 2023 and English translation thereof.

* cited by examiner

FIG. 7

FIRST TEST RESULTS WHEN USING THREE-FLUTE DRILLS

| DISTANCE L | SHAPE OF GASH PORTION | | | | | | |
|---|---|---|---|---|---|---|---|
| | R PORTIONS + STRAIGHT PORTIONS (DRILL OF PRESENT APPLICATION) | | | | | | R PORTIONS ONLY (KNOWN DRILL) |
| | TANGENTIAL ANGLE θ | | | | | | |
| | 4° | 8° | 12° | 16° | 20° | 24° | |
| 0.27D | ○ | △ | △ | △ | △ | △ | × |
| 0.30D | ○ | ○ | ○ | ○ | ○ | △ | × |
| 0.33D | ○ | ○ | ○ | ○ | ○ | △ | × |
| 0.36D | ○ | ○ | ○ | ○ | ○ | △ | △ |
| 0.39D | ○ | ○ | ○ | ○ | ○ | △ | △ |
| 0.42D | ○ | ○ | ○ | ○ | ○ | △ | △ |
| 0.45D | ○ | ○ | ○ | ○ | ○ | △ | △ |
| 0.48D | △ | △ | △ | △ | △ | △ | × |

FIG. 8

FIRST TEST RESULTS WHEN USING TWO-FLUTE DRILLS

| DISTANCE L | SHAPE OF GASH PORTION | | | | | | | |
|---|---|---|---|---|---|---|---|---|
| | R PORTIONS + STRAIGHT PORTIONS (DRILL OF PRESENT APPLICATION) | | | | | | | R PORTIONS ONLY (KNOWN DRILL) |
| | TANGENTIAL ANGLE θ | | | | | | | |
| | 4° | 8° | 12° | 16° | 20° | 24° | | |
| 0.27D | ○ | ○ | △ | △ | △ | △ | | × |
| 0.30D | ○ | ○ | ○ | ○ | ○ | △ | | △ |
| 0.33D | ○ | ○ | ○ | ○ | ○ | △ | | △ |
| 0.36D | ○ | ○ | ○ | ○ | ○ | △ | | △ |
| 0.39D | ○ | ○ | ○ | ○ | ○ | △ | | △ |
| 0.42D | ○ | ○ | ○ | ○ | ○ | △ | | △ |
| 0.45D | △ | △ | △ | △ | △ | △ | | △ |
| 0.48D | △ | △ | △ | △ | △ | △ | | × |

THIRD TEST RESULTS

FOURTH TEST RESULTS (FEED AMOUNT 0.35 mm/rev)

(A) 101G (B) 101H

FOURTH TEST RESULTS (FEED AMOUNT 0.40 mm/rev)

FOURTH TEST RESULTS (FEED AMOUNT 0.27 mm/rev)

FOURTH TEST RESULTS (FEED AMOUNT 0.35 mm/rev)

FOURTH TEST RESULTS (FEED AMOUNT 0.40 mm/rev)

DRILL

TECHNICAL FIELD

The present invention relates to a drill.

BACKGROUND ART

In a drill described in Patent Literature 1, a thinning edge and an R gash are provided on a leading end portion of a body. The thinning edge is formed from an inner end of a cutting edge toward a chisel by performing thinning processing to thin a remaining width of the chisel in the center of the drill. The R gash is formed so as to extend in a circular arc shape from an inner end side of the thinning edge toward an outer peripheral surface of the body. The body is provided with a discharge groove to discharge chips of a workpiece at a time of machining. An end portion on a outer side in the radial direction of the R gash is connected to the discharge groove further to the inner side in the radial direction than the outer peripheral surface of the body, so that the chips of the workpiece do not flow to the outer peripheral side of the body at the time of machining.

CITATION LIST

Patent Literature

Patent Literature 1: Japanese Laid-Open Patent Publication No. 2016-59999

SUMMARY OF INVENTION

In the above-described drill, at the time of machining, the chips of the workpiece flow to the outer peripheral side of the body along a curved surface of the R gash. As a result, there is still a possibility of deterioration in discharge performance of the chips. When the chips flow to the outer peripheral side of the body, curling of the chips becomes weak, and there is a case in which the chips are not finely divided. In this case, the chips are not smoothly discharged to the discharge groove, and clogging of the chips, vibration during the machining, an increase in cutting resistance, and the like may occur. As a result, there is a possibility that the above-described drill may not have a stable lifetime.

It is an object of the present invention to provide a drill which can improve discharge performance of chips at a time of machining, and which can reduce and stabilize cutting resistance.

A drill according to one aspect of the present invention includes: a body configured to extend along a shaft center; a plurality of discharge grooves provided in a helical shape in an outer peripheral surface of the body from a leading end portion of the body toward a base end portion of the body; a cutting edge provided on a ridge section between an inner face of the discharge groove and a flank on the leading end portion of the body, the inner face being oriented toward a rotation direction side of the body; a thinning edge configured to extend from an inner end of the cutting edge, in a radial direction of the body, toward an inner side in the radial direction; and a gash portion including an R portion in which a first ridge line between the R portion and the flank extends while curving toward the rotation direction, from an inner end in the radial direction of the thinning edge toward an outer side in the radial direction, and a straight portion in which a second ridge line between the straight portion and the flank extends linearly from an outer end of the first ridge line in the radial direction toward the outer side in the radial direction. The straight portion is configured to connect to the discharge groove further to the inner side in the radial direction than the outer peripheral surface of the body.

According to the above-described aspect, curling of the chips is enhanced by the R portion of the gash portion. As a result, the chips are finely divided, and the shape of the chips becomes stable. Further, since the straight portion connects to the discharge groove further to the inner side in the radial direction than the outer peripheral surface of the body, the chips are smoothly discharged by the straight portion not in a direction toward the outer peripheral surface of the body, but in a direction toward the discharge groove. Thus, the drill can improve the discharge performance of the chips at a time of machining, and can reduce and stabilize cutting resistance.

In the drill according to the one aspect of the present invention, a distance from the shaft center to a position at which the second ridge line connects to the discharge groove may be equal to or more than 30 percent and equal to or less than 45 percent of an outer diameter of the body. In this case, since the generated chips have a stable curl shape due to the R portion, the shape of the chips becomes stable. Thus, the drill can stabilize the discharge performance of the chips of the workpiece at the time of machining.

In the drill according to the one aspect of the present invention, as seen from a direction in which the shaft center extends, an angle between the second ridge line and a tangential line at the outer end in the radial direction of the first ridge line may be equal to or less than 20 degrees. In this case, the curled chips are stably discharged to each of the discharge grooves by the straight portion. Thus, the drill can stabilize the discharge performance of the chips of the workpiece at the time of machining.

BRIEF DESCRIPTION OF DRAWINGS

FIG. 7 is a diagram showing first test results when using three-flute drills.

FIG. 8 is a diagram showing first test results when using two-flute drills.

DESCRIPTION OF EMBODIMENTS

First Embodiment

Figure 1:
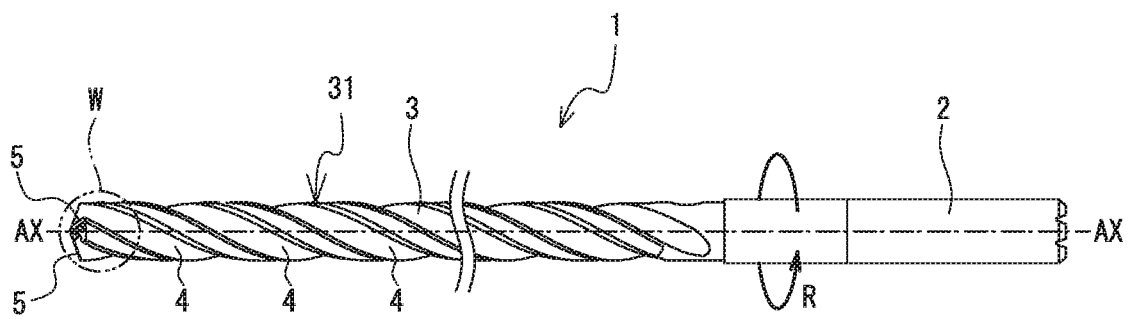
FIG. 1 is a side view of a three-flute drill 1 of a first embodiment.

The configuration of a three-flute drill 1 according to a first embodiment of the present invention will be explained with reference to FIG. 1 to FIG. 3. As shown in FIG. 1, the three-flute drill 1 is substantially column-shaped and is provided with a shank 2 and a body 3. The shank 2 is held by a main shaft of a machine tool (not shown in the drawings). The body 3 extends from the shank 2 along a shaft center AX. Hereinafter, an end portion of the body 3 on the shank 2 side (the right side in FIG. 1) will be referred to as a "base end portion of the body 3," and an end portion of the body 3 on an opposite side (the left side in FIG. 1) to the shank 2 will be referred to as a "leading end portion of the body 3." A radial direction of the body 3 will be simply referred to as a "radial direction." The shaft center AX is orthogonal to the radial direction.

The three-flute drill 1 cuts a workpiece by rotating around the shaft center AX and forms a machining hole. At a time of machining, a rotation direction R of the three-flute drill 1 is a counterclockwise direction as seen from the leading end portion side of the body 3 (hereinafter referred to as a "front view").

Three discharge grooves 4 are provided in an outer peripheral surface 31 of the body 3. Each of the three discharge grooves 4 opens at the leading end portion of the body 3. Each of the three discharge grooves 4 is formed in a helical shape in a clockwise direction in the front view, from the leading end portion of the body 3 toward the base end portion of the body 3. At the time of machining, the discharge grooves 4 are used to discharge chips from the machining hole.

Figure 2:
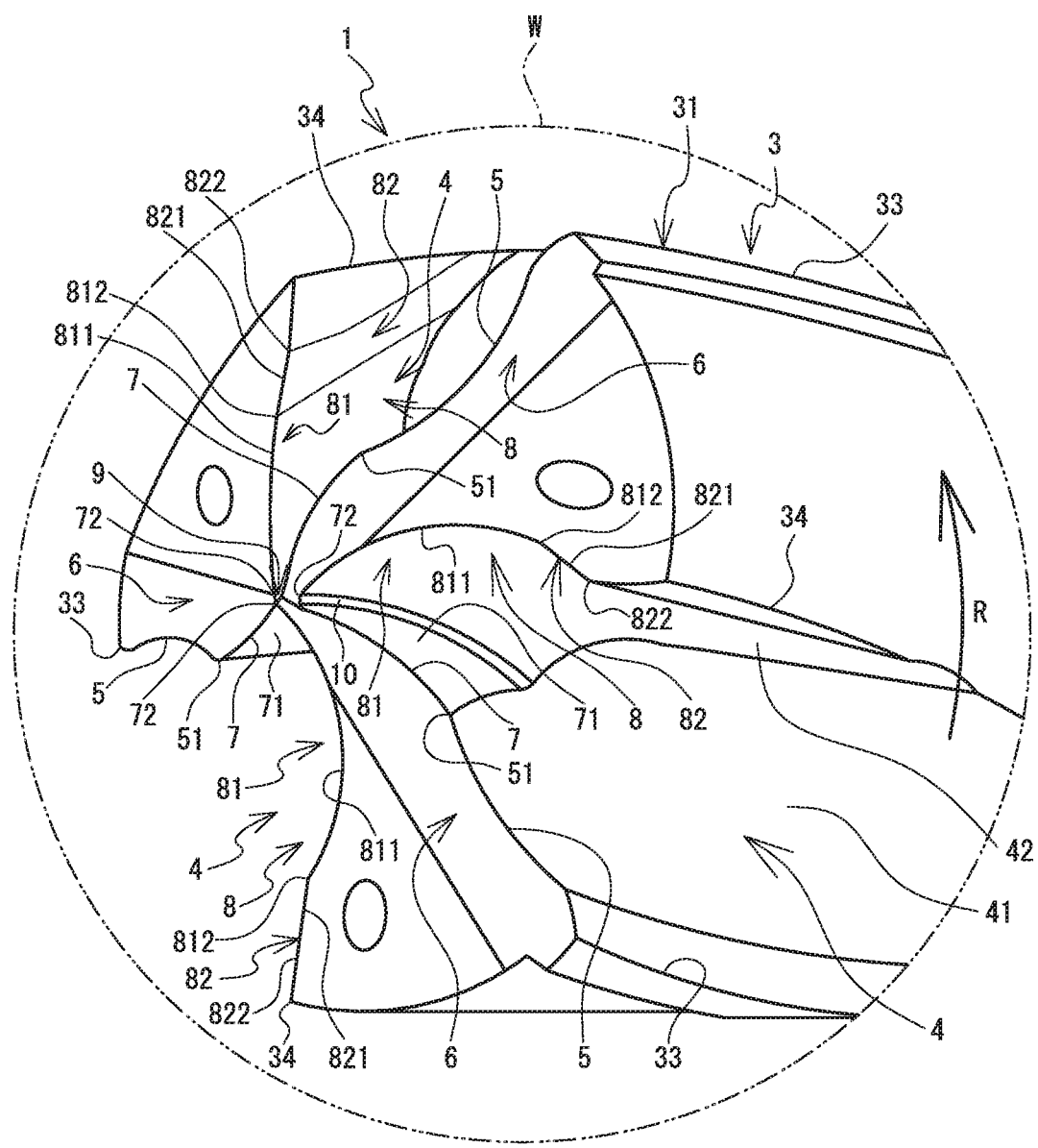
FIG. 2 is an enlarged perspective view of an area W shown in FIG. 1.
Figure 3:
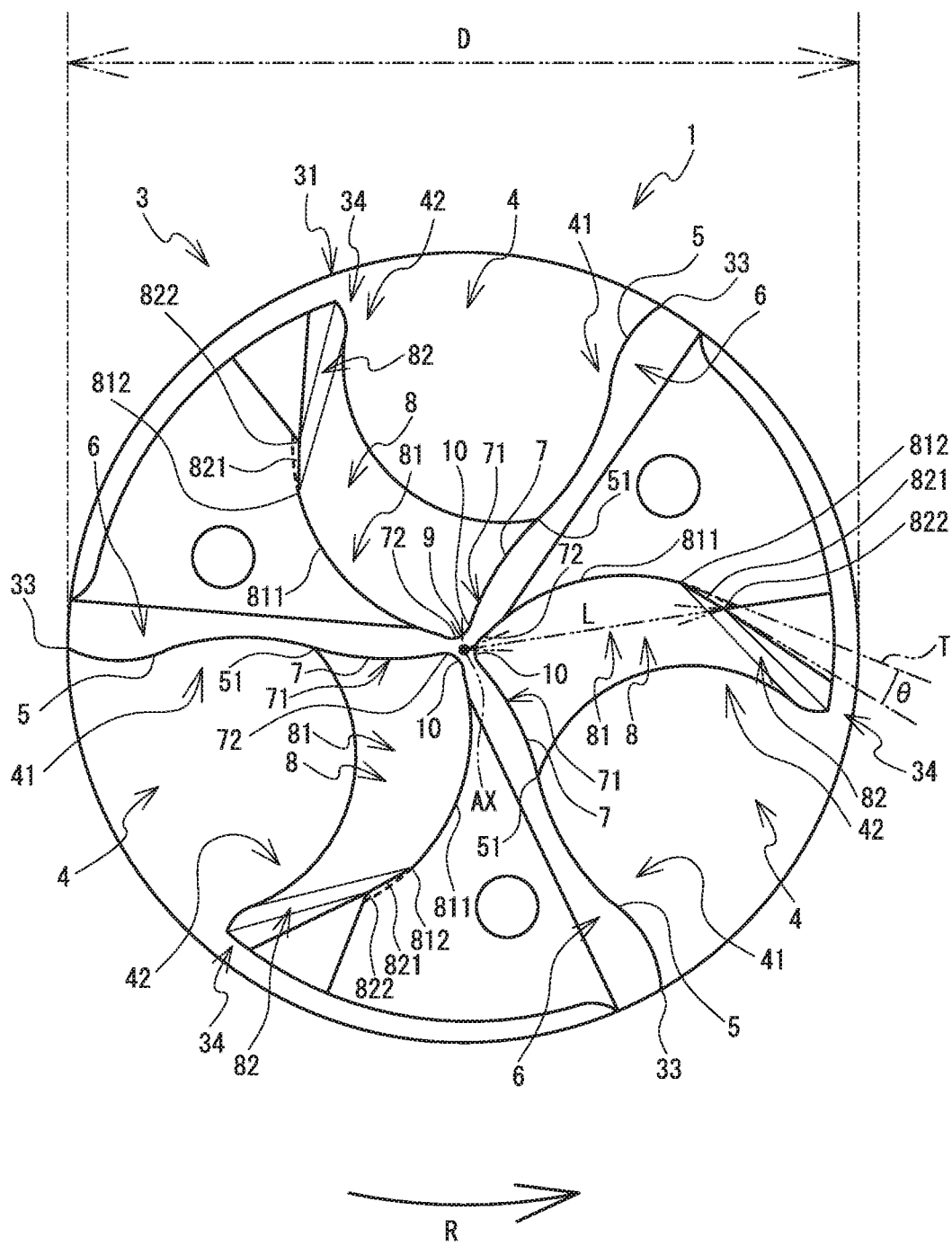
FIG. 3 is a front view of the three-flute drill 1 of the first embodiment.

As shown in FIG. 2 and FIG. 3, each of the discharge grooves 4 is configured by an inner face 41 that is oriented toward the rotation direction R side and an inner face 42 that is oriented toward the opposite side to the rotation direction R. Ridge sections at which the inner faces 41 and the outer peripheral surface 31 intersect with each other are leading edges 33. Ridge sections at which the inner faces 42 and the outer peripheral surface 31 intersect with each other are heels 34.

Flanks 6 are formed on the leading end portion of the body 3. The flanks 6 extend so as to be inclined toward the base end portion side of the body 3, from ends of the respective inner faces 41 on the leading end portion side of the body 3 toward the opposite side to the rotation direction R. Cutting edges 5 are provided on ridge sections at which the inner faces 41 and the flanks 6 intersect with each other.

In the first embodiment, since there are three of the inner faces 41 and three of the flanks 6, the number of the cutting edges 5 is three. The cutting edges 5 each have a substantially S shape in the front view and cut the workpiece. The inner face 41 in the vicinity of the cutting edge 5 is a so-called rake face that scoops up the chips cut by the cutting edge 5.

A chisel 9 is formed in the center of the leading end portion of the body 3. Thinning edges 7 are formed in the vicinity of the chisel 9. The thinning edges 7 each extend in a circular arc shape that is curved toward the rotation direction R in the front view, from an inner end 51 in the radial direction of the cutting edge 5 toward an inner side in the radial direction (i.e., toward the chisel 9). The thinning edges 7 are formed on ridge sections between thinning faces 71 and the flanks 6. The thinning faces 71 extend from the thinning edges 7 to the base end portion side of the body 3, and are oriented toward the rotation direction R side. The thinning faces 71 are so-called rake faces.

Gash portions 8 are formed on the leading end portion of the body 3. The gash portions 8 are provided on the inner faces 42 on the leading end portion side of the body 3. The gash portions 8 are each formed in a surface shape, and are oriented to the opposite side to the rotation direction R. At the time of machining, the gash portions 8 cause the chips scooped up by the rake faces to curl and to be discharged to the discharge grooves 4. More specifically, each of the gash portions 8 has an R portion 81 and a straight portion 82. Hereinafter, a ridge line between the R portion 81 and the flank 6 will be referred to as a "first ridge line 811," and a ridge line between the straight portion 82 and the flank 6 will be referred to as a "second ridge line 821."

The first ridge line 811 extends while curving toward the rotation direction R in the front view, from an inner end 72 in the radial direction of the thinning edge 7 toward an outer side in the radial direction. Note that, in FIG. 3, an extended section obtained by extending the first ridge line 811 toward the outer side in the radial direction from an outer end 812 in the radial direction is shown by a broken line (this also applies to FIG. 5 and FIG. 6). Each of the R portions 81 extends from the first ridge line 811 to the base end portion side of the body 3, and is formed in a curved surface shape that is curved toward the rotation direction R side in the front view. The curling of the chips cut by the thinning edges 7 is enhanced by the R portions 81.

The second ridge line 821 extends linearly from the outer end 812 in the radial direction of the first ridge line 811 toward the outer side in the radial direction. An outer end 822 in the radial direction of the second ridge line 821 connects to the discharge groove 4 further to the inner side in the radial direction than the outer peripheral surface 31. Specifically, the second ridge line 821 connects to the discharge groove 4 further to the inner side in the radial direction than a position at which the extended section, which is obtained by extending the first ridge line 811 toward the outer side in the radial direction from the outer end 812 in the radial direction, connects to the discharge groove 4.

Each of the straight portions 82 extends from the second ridge line 821 toward the base end portion side of the body 3 so as to separate from the shaft center AX, and is formed along the inner face 42. Note that, in FIG. 3, boundary lines between the R portions 81 and the straight portions 82 are shown by straight solid lines for the purpose of convenience (this also applied to FIG. 5 and FIG. 6). However, in actuality, since the boundary lines are generated by interference between the straight portions 82 and the helicallytwisted discharge grooves 4, the boundary lines are not straight lines in the front view. More specifically, the boundary lines are formed so as to be curved along the discharge grooves 4. The chips curled by the R portions 81 are guided by the straight portions 82 so as to flow to the base end portion side of the body 3 through the discharge grooves 4.

Circular arc grooves 10 are formed in connecting sections of inner ends in the radial directions of the R portions 81 and inner ends in the radial directions of the thinning faces 71. Each of the circular arc grooves 10 extends from the chisel 9 toward the discharge groove 4 and is formed in a circular arc shape that is curved toward the inner side in the radial direction in the front view. The circular arc grooves 10 cause the chips scooped up by the thinning faces 71 to flow smoothly to the gash portions 8.

Movement of the chips generated at the time of machining by the three-flute drill 1 will be explained. After the thinning edges 7 bite into the workpiece, when the cutting edges 5 cut the workpiece, the chips are generated. The generated chips are scooped up by the rake faces and are pushed out to the gash portions 8 by the circular arc grooves 10. The pushed-out chips are rounded and curled by the R portions 81. Since each of the straight portions 82 connects to the discharge groove 4 further to the inner side in the radial direction than the outer peripheral surface 31 of the body 3, the chips are smoothly discharged by the straight portions 82 not in a direction toward the outer peripheral surface 31 of the body 3, but in a direction toward the discharge groove 4.

The chips are pushed out to the base end portion side of the body 3 through the discharge grooves 4. At this time, since the straight portions 82 are provided as walls on the heel 34 side of the R portions 81, the chips are held by the walls of the gash portions 8. Thus, the curling of the chips is further enhanced, and the chips are cut finely. In the three-flute drill 1, the curling of the chips is enhanced by the R portions 81 of the gash portions 8. As a result, the chips are divided finely, and the shape of the chips becomes stable. The cut chips flow to the base end portion side of the body 3 through the discharge grooves 4, and are discharged to the outside from the machining hole. As described above, the three-flute drill 1 can improve discharge performance of the chips at the time of machining, and can reduce and stabilize cutting resistance.

Second Embodiment

Figure 4:
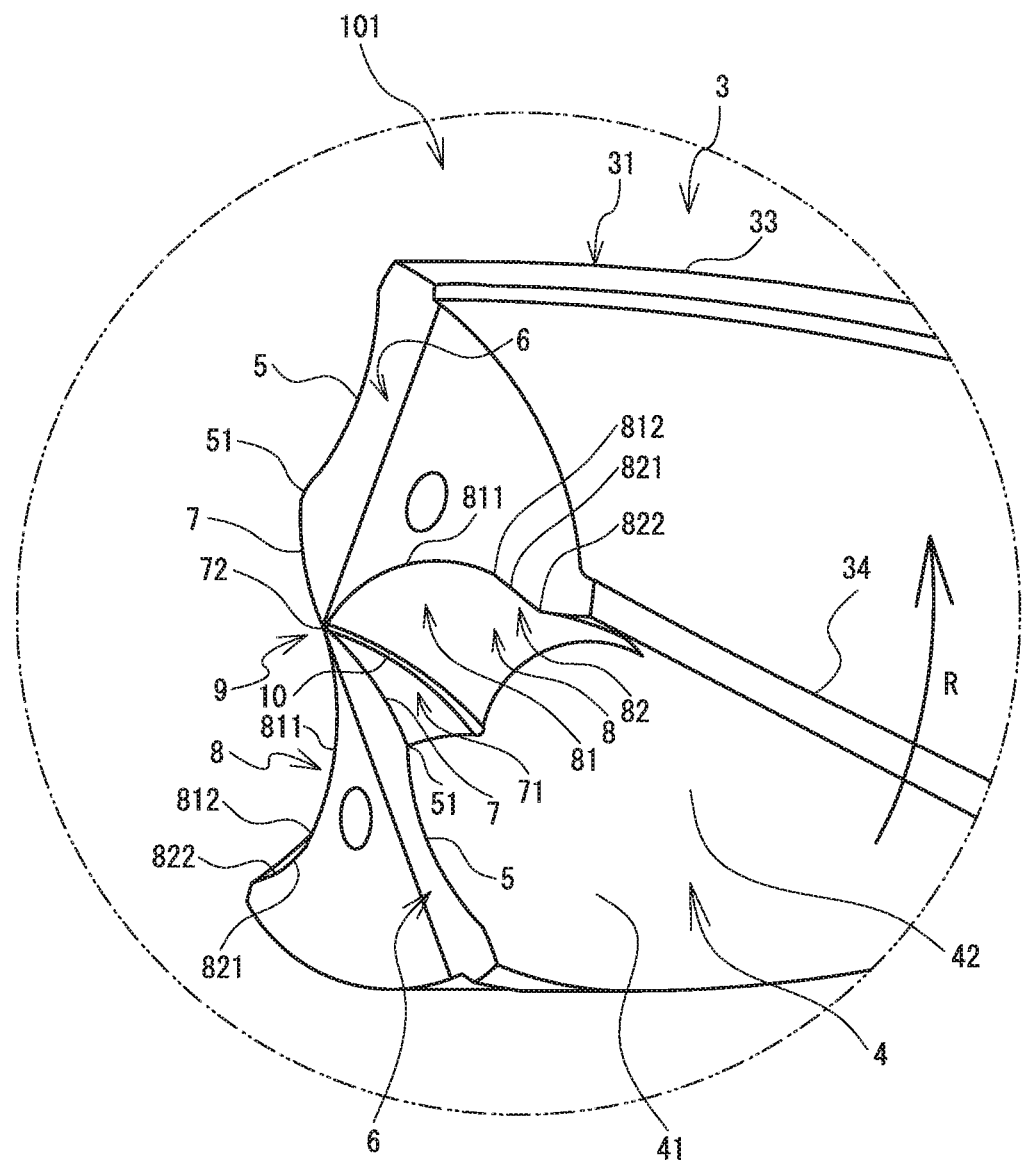
FIG. 4 is an enlarged perspective view of a section, which corresponds to the area W, in a two-flute drill 101 of a second embodiment.

A two-flute drill 101 according to a second embodiment of the present invention will be explained with reference to FIG. 4 and FIG. 5. The basic configuration of the two-flute drill 101 and the movement of the chips generated at a time of machining by the two-flute drill 101 are substantially the same as those of the three-flute drill 1. The two-flute drill 101 is different from the three-flute drill 1 in the number of edges. In the description below, the same reference numerals as those of the first embodiment will be assigned to structural elements having the same function as the first embodiment, and the explanation of the two-flute drill 101 will be simplified.

In the two-flute drill 101, two of the discharge grooves 4 are provided in the outer peripheral surface 31 of the body 3. The flanks 6 are formed on the leading end portion of the body 3. The cutting edges 5 are formed on ridge sections at which the inner faces 41 and flanks 6 intersect with each other. In the second embodiment, there are two of the inner faces 41 and two of the flanks 6, and therefore, the number of the cutting edges 5 is two.

In the same manner as in the first embodiment, each of the gash portions 8 has the R portion 81 and the straight portion 82. The first ridge line 811 extends while curving toward the rotation direction R in the front view, from the inner end 72 in the radial direction of the thinning edge 7 toward the outer side in the radial direction. Each of the R portions 81 extends from the first ridge line 811 to the base end portion side of the body 3, and is formed in a curved surface shape that is curved toward the rotation direction R side in the front view.

The second ridge line 821 extends linearly from the outer end 812 of the first ridge line 811 in the radial direction toward the outer side in the radial direction. The outer end 822 of the second ridge line 821 in the radial direction connects to the discharge groove 4 further to the inner side in the radial direction than the outer peripheral surface 31. Each of the straight portions 82 extends from the second ridge line 821 toward the base end portion side of the body 3 so as to separate from the shaft center AX, and is formed along the inner face 42.

Modified Examples

The present invention is not limited to each of the above-described embodiments, and various modifications are possible. The rotation direction R may be the clockwise direction in the front view. The circular arc grooves 10 need not necessarily be provided. In other words, the connecting sections between the thinning edges 7 and the R portions 81 may be angular. The number of edges is not limited to the above-described embodiments. Each of the above-described embodiments may be a so-called double margin drill in which body clearances are provided in intermediate sections between the leading edges 33 and the heels 34, or may be a so-called single margin drill in which the body clearances reach the heels 34. Alternatively, the body clearances need not necessarily be provided. The second ridge line 821 may connect to the discharge groove 4 at the same position as the position at which the extended section, which is obtained by extending the first ridge line 811 toward the outer side in the radial direction from the outer end 812 in the radial direction, connects to the discharge groove 4, or on the outer side in the radial direction.

Figure 6:
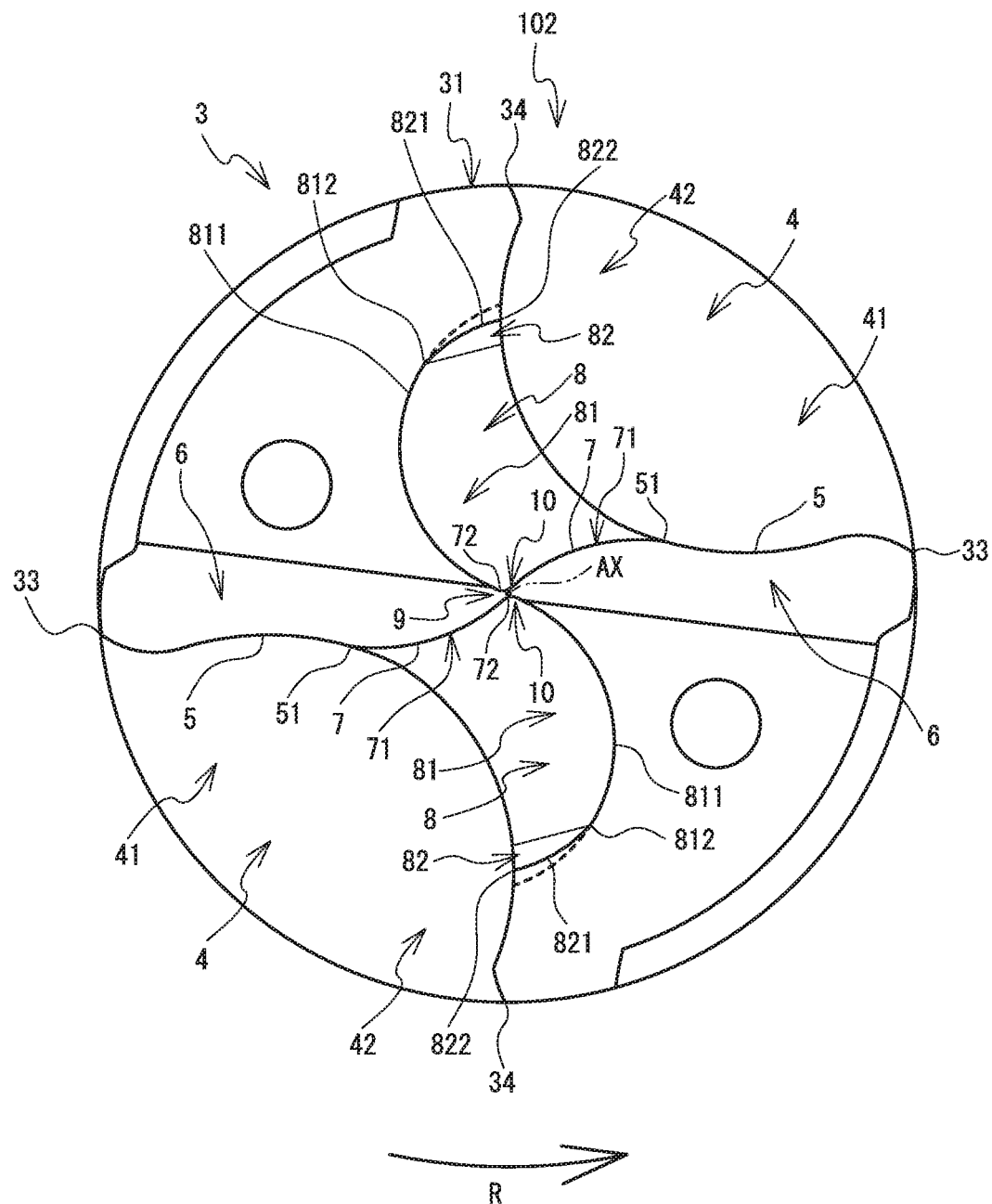
FIG. 6 is a front view of a two-flute drill 102 of a modified example.

In the above-described embodiments, the second ridge line 821 extends linearly from the outer end 812 of the first ridge line 811 in the radial direction toward the outer side in the radial direction. In contrast to this, as shown in FIG. 6, in a two-flute drill 102 of a modified example, the second ridge line 821 extends while curving toward the rotation direction R in the front view, from the outer end 812 of the first ridge line 811 in the radial direction toward the outer side in the radial direction. It is sufficient that a radius of curvature of the second ridge line 821 be greater than a radius of curvature of the first ridge line 811. The second ridge line 821 connects to the discharge groove 4 further to the inner side in the radial direction than the position at which the extended section, which is obtained by extending the first ridge line 811 toward the outer side in the radial direction from the end 812, connects to the discharge groove 4. In the same manner as the above-described embodiments, the two-flute drill 102 can improve the discharge performance of the chips at the time of machining, and can reduce and stabilize the cutting resistance. Note that similar modifications can be made for the three-flute drill 1.

Overview of Evaluation Tests

Various evaluation tests, to be explained later, were performed in order to verify the effects of providing both the R portions 81 and the straight portions 82 on the gash portions

8 in the first embodiment and the second embodiment. In the description below, a three-flute drill in which the straight portions 82 are not provided on the gash portions 8 and only the R portions 81 are provided, or a three-flute drill in which the R portions 81 are not provided on the gash portions 8 and only the straight portions 82 are provided will be referred to as a "known three-flute drill" (not shown in the drawings). A two-flute drill in which the straight portions 82 are not provided on the gash portions 8 and the only R portions 81 are provided, or a two-flute drill in which the R portions 81 are not provided on the gash portions 8 and only the straight portions 82 are provided will be referred to as a "known two-flute drill" (not shown in the drawings).

First Test

Figure 5:
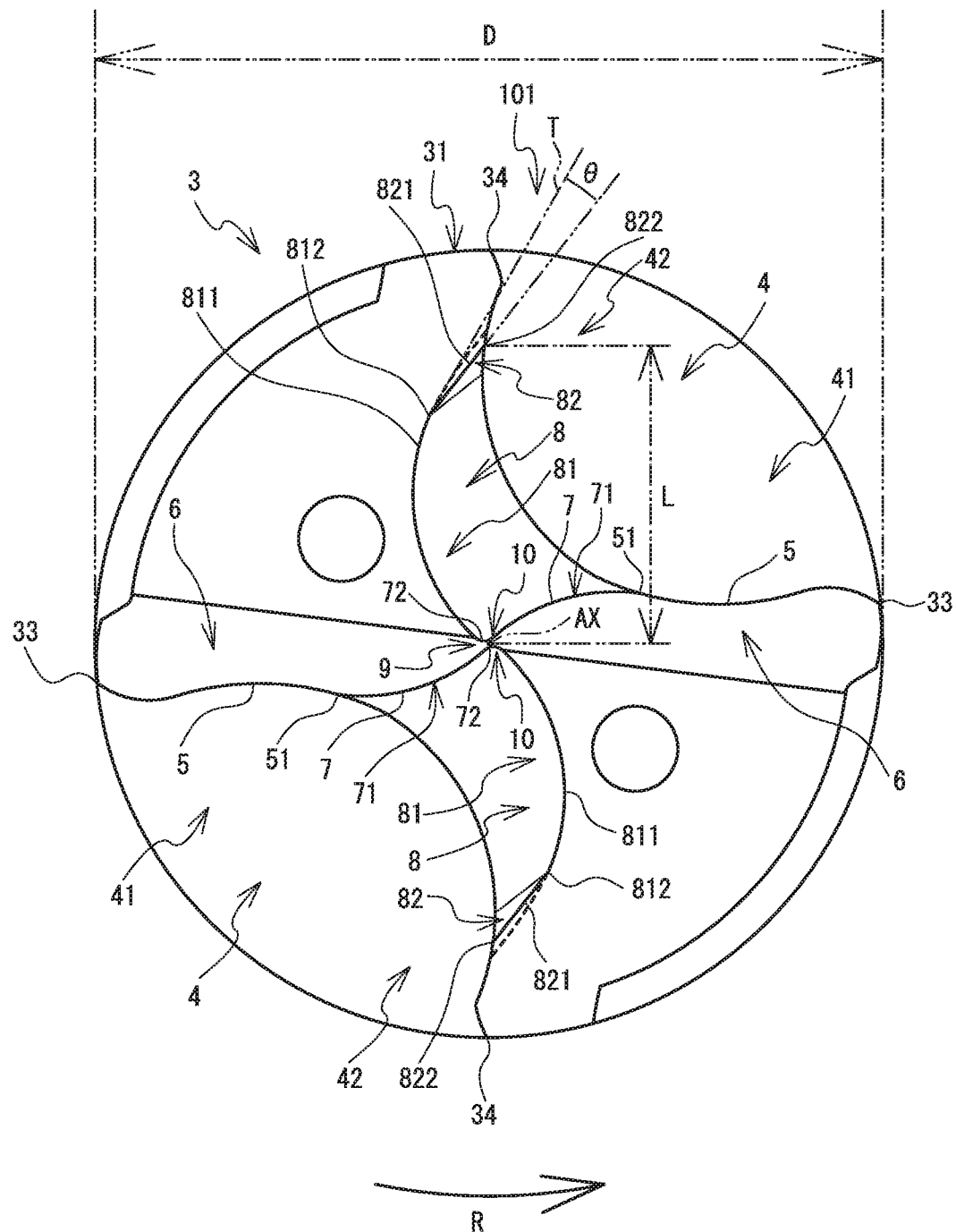
FIG. 5 is a front view of the two-flute drill 101 of the second embodiment.

As shown in FIG. 3 and FIG. 5, an outer diameter of the body 3 is denoted as an "outer diameter D." In the front view, an angle between the second ridge line 821 and a tangential line T at the outer end 812 of the first ridge line 811 in the radial direction is denoted as a "tangential angle θ." In the front view, a distance from the shaft center AX to the outer end 822 of the second ridge line 821 in the radial direction (namely, the position at which the second ridge line 821 connects to the discharge groove 4) is denoted as a "distance L." With respect to each of the three-flute drill 1 of the first embodiment and the two-flute drill 101 of the second embodiment, a first test was performed to verify a drill lifetime that differs depending on the tangential angle θ and the distance L, and differences of the drill lifetime with respect to the known three-flute drill and the known two-flute drill.

The tangential angle θ was changed every 4°, from 4° to 24°. The distance L was changed every 0.03 D (namely, 3% of the outer diameter D, hereinafter the same notation will be used), from 0.27 D to 0.48 D (refer to FIG. 7 and FIG. 8). Note that the straight portions 82 are not provided on the known drills, and thus the concept of the tangential angle θ is not present. In the known drills, the distance L corresponds to a distance from the shaft center AX to the outer end 812 of the first ridge line 811 in the radial direction.

Criteria for first test results were as follows:

○: A case in which there is no breakage or chipping of the drill at a time point at which a total length of cutting is 50 m, and a friction width of the flank 6 is equal to or less than 0.2 mm.

Δ: A case in which the breakage or chipping of the drill occurs before the total length of the cutting reaches 50 m, or a case in which the friction with of the flank 6 exceeds 0.2 mm at the time point at which the total length of the cutting is 50 m.

x: A case in which the breakage or chipping of the drill occurs during an initial time period (before a number of machining holes reaches ten).

Conditions for the first test performed using the three-flute drill 1 and the known three-flute drill were as follows:

Outer diameter D: 5 mm
Workpiece: SCM440 (green wood)
Machining depth: 25 mm
Cutting speed: 100 m/min
Feed amount: 0.25 mm/rev As shown in the column "R PORTIONS+STRAIGHT PORTIONS (DRILL OF PRESENT APPLICATION)" in FIG. 7, when using the three-flute drill 1, when the distance L is 0.27 D or more and 0.48 D or less and the tangential angle θ is 24° or less, judgement results are not "x." Meanwhile, as shown in the column "R PORTIONS ONLY (KNOWN DRILL)," when using the known three-flute drill, when the distance L is 0.27 D or more and 0.48 D or less, the judgement results are not "○."

More specifically, with the three-flute drill 1, when the tangential angle θ is 20° or less, most of the judgement results are "○." When the distance L is 0.30 D or more and 0.45 D or less, most of the judgement results are "○." When the tangential angle θ is 20° or less and the distance L is 0.30 D or more and 0.45 D or less, all the judgement results are "○."

Conditions for the first test performed using the two-flute drill 101 and the known two-flute drill were as follows:

Outer diameter D: 8.5 mm
Workpiece: SCM440 (green wood)
Machining depth: 42.5 mm
Cutting speed: 100 m/min
Feed amount: 0.34 mm/rev As shown in the column "R PORTIONS+STRAIGHT PORTIONS (DRILL OF PRESENT APPLICATION)" in FIG. 8, when using the two-flute drill 101, the judgement results are not "x" when the distance L is 0.27 D or more and 0.48 D or less and the tangential angle θ is 24° or less. Meanwhile, as shown in the column "R PORTIONS ONLY (KNOWN DRILL)" in FIG. 7, when using the known two-flute drill, the judgement results are not "○" when the distance L is 0.27 D or more and 0.48 D or less.

More specifically, with the two-flute drill 101, when the tangential angle θ is 20° or less, most of the judgement results are "○." When the distance L is 0.30 D or more and 0.45 D or less, most of the judgement results are "○." When the tangential angle θ is 20° or less and the distance L is 0.30 D or more and 0.45 D or less, all the judgement results are "○."

As described above, with the three-flute drill 1 and the two-flute drill 101, it was verified that a long and stable drill lifetime can be obtained when the tangential angle θ is 20° or less. When the tangential angle θ is 20° or less, since the generated chips have a stable curl shape due to the R portions 81, the shape of the chips becomes stable. Thus, the three-flute drill 1 and the two-flute drill 101 can further stabilize the discharge performance of the chips of the workpiece at the time of machining.

It was verified that a long and stable drill lifetime can be obtained when the distance L is 0.30 D or more and 0.45 D or less. When the distance L is 0.30 D or more and 0.45 D or less, the curled chips are stably discharged to the discharge grooves 4 by the straight portions 82. Thus, the three-flute drill 1 and the two-flute drill 101 can stabilize the discharge performance of the chips of the workpiece at the time of machining.

According to the results of the first test, it is preferable that the tangential angle θ be 20° or less and the distance L be 0.30 D or more and 0.45 D or less. Note that the tangential angle θ may be more than 20°. The distance L may be less than 0.30 D or may be more than 0.45 D. For example, when using the three-flute drill 1, when the tangential angle θ is 4° and the distance L is 0.27 D, the judgement result is "○" (refer to FIG. 7). When using the two-flute drill 101, when the tangential angle θ is 8° or less and the distance L is 0.27 D, the judgement result is "○" (refer to FIG. 8).

Second Test

With respect to the three-flute drill 1 of the first embodiment and known three-flute drills, a second test was performed to verify differences in the drill lifetime caused by a shape difference of the gash portions 8. Specifically, a hole durability number was counted with an upper limit of 1,200 holes, with respect to each of three-flute drills 1A (N1 to N3)

of the first embodiment in which the gash portions 8 were formed by the R portions 81 and the straight portions 82, known three-flute drills 1B (N1 to N3) in which the gash portions 8 were formed by the R portions 81 only, and known three-flute drills 1C (N1 to N3) in which the gash portions 8 were formed by the straight portions 82 only. The hole durability number is the number of machining holes that can be machined without chipping or breakage of the three-flute drill 1. Note that "N" indicates a number of the test.

Figure 9:
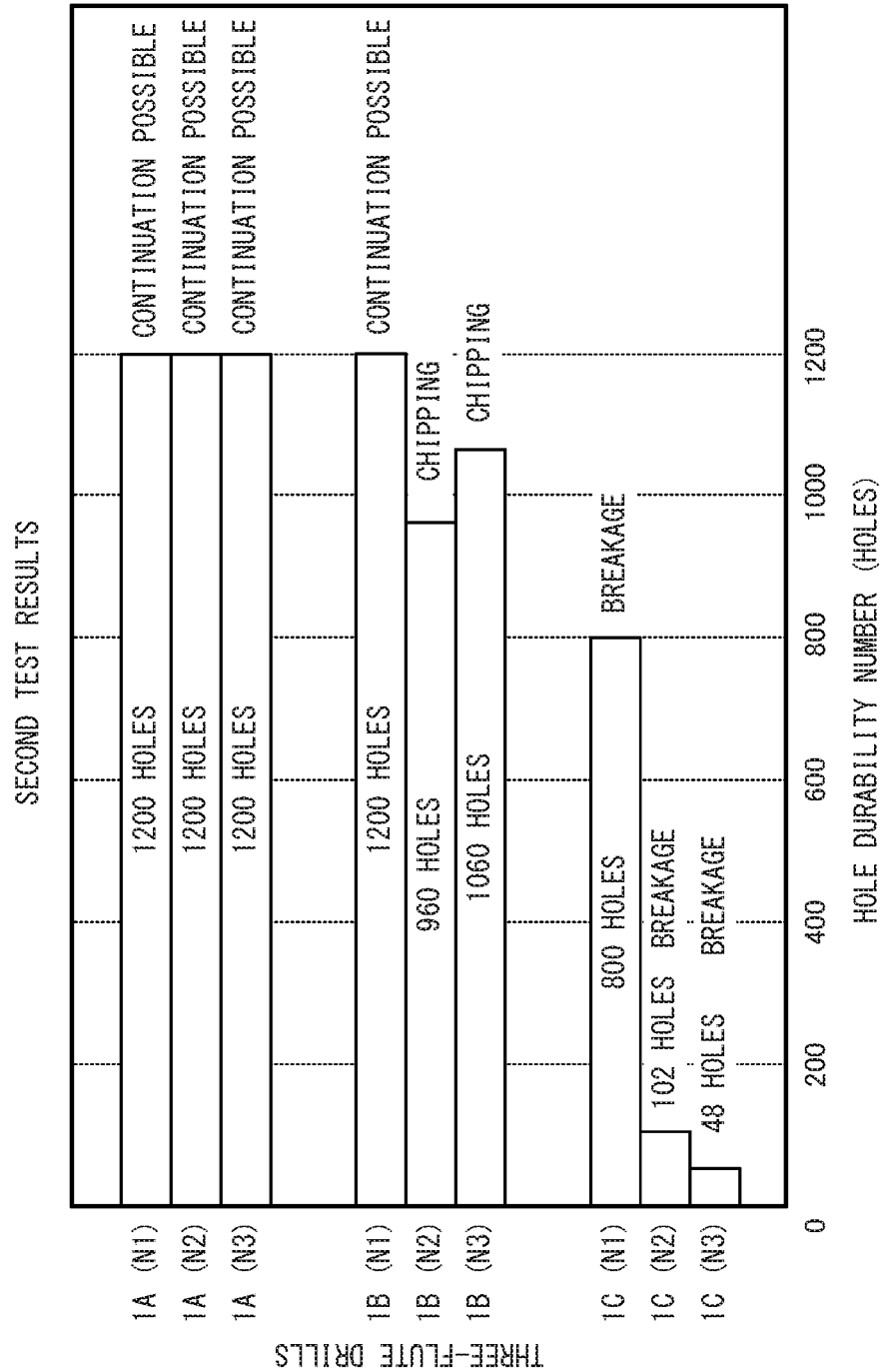
FIG. 9 shows second test results, and is a graph showing a hole durability number of each of the three-flute drills.

Conditions for the second test were as follows:
Outer diameter D: 8.4 mm
Workpiece: material corresponding to S50C
Machining depth: 40 mm
Cutting speed: 80 m/min
Feed amount: 0.38 mm/rev In the graph shown in FIG. 9, the horizontal axis corresponds to the hole durability number, and the vertical axis corresponds to each of the three-flute drills 1A (N1 to N3), 1B (N1 to N3), and 1C (N1 to N3). As shown in FIG. 9, the hole durability number of the three-flute drills 1A (N1 to N3) is 1,200 (the upper limit of the second test) in every case. In other words, it was verified that the hole durability number of the three-flute drill 1A is equal to or more than 1,200.

The hole durability number of the known three-flute drill 1B (N1) was 1,200 (the upper limit of the second test), the hole durability number of the known three-flute drill 1B (N2) was 960, and the hole durability number of the known three-flute drill 1B (N3) was 1,060. More specifically, chipping of the known three-flute drill 1B (N2) occurred when 960 holes were machined, and chipping of the known three-flute drill 1B (N3) occurred when 1,060 holes were machined.

The hole durability number of the known three-flute drill 1C (N1) was 800, the hole durability number of the known three-flute drill 1C (N2) was 102, and the hole durability number of the known three-flute drill 1B (N3) was 48. More specifically, breakage of the known three-flute drill 1C (N1) occurred when 800 holes were machined, breakage of the known three-flute drill 1C (N2) occurred when 102 holes were machined, and breakage of the known three-flute drill 1C (N3) occurred when 48 holes were machined.

As described above, a longer and more stable drill lifetime was obtained by the three-flute drills 1A (N1 to N3) than the known three-flute drills 1B (N1 to N3) and 1C (N1 to N3).

Third Test

With respect to the two-flute drill 101 of the second embodiment and known two-flute drills, a third test was performed to verify differences in the cutting resistance caused by the shape difference of the gash portions 8. Specifically, a maximum thrust load and a maximum torque when machining the workpiece were measured with respect to each of a two-flute drill 101A of the second embodiment in which the gash portions 8 were formed by the R portions 81 and the straight portions 82, a known two-flute drill 101B in which the gash portions 8 were formed by the R portions 81 only, and a known two-flute drill 101C in which the gash portions 8 were formed by the straight portions 82 only.

Conditions for the third test were as follows:
Outer diameter D: 4.95 mm
Workpiece: 38 Mn
Machining depth: 91 mm
Cutting speed: 80 m/min
Feed amount: 0.4 mm/rev
Other: guide hole used (inner diameter 5.03 mm, machining depth 15 mm)

Figure 10:
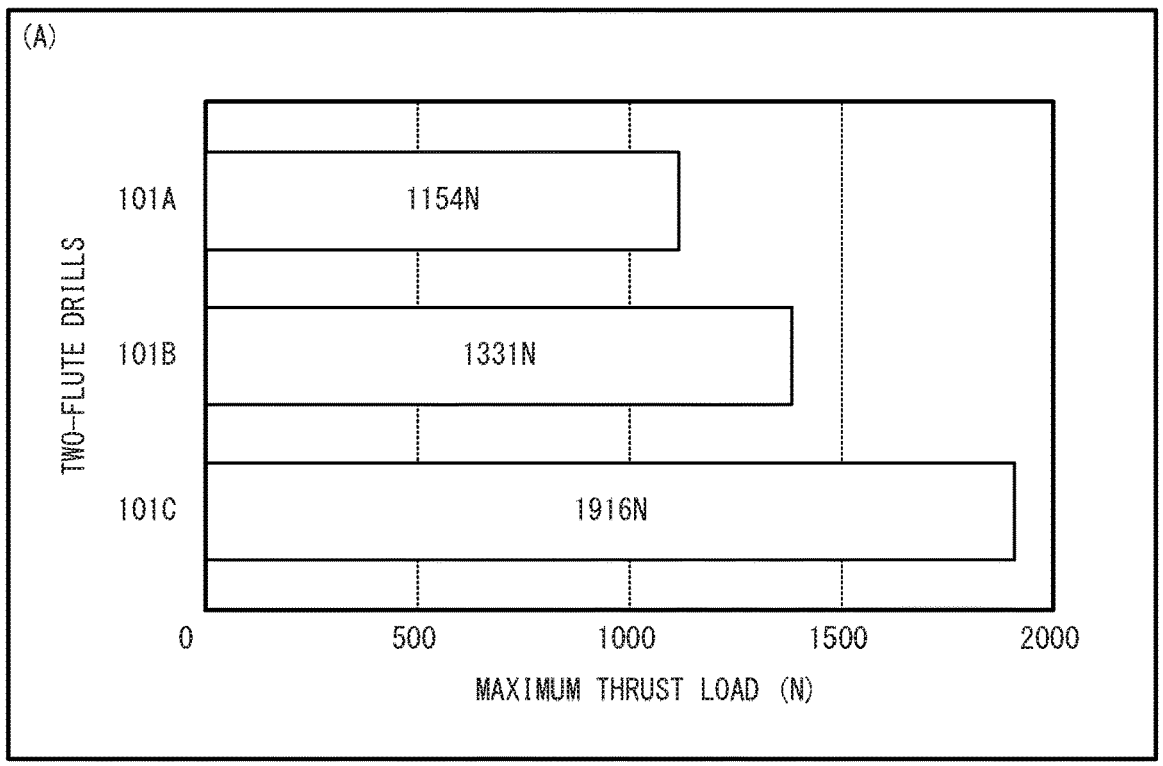
FIG. 10 shows third test results, and includes graphs showing a maximum thrust load and a maximum torque of each of the two-flute drills.
Figure 10:
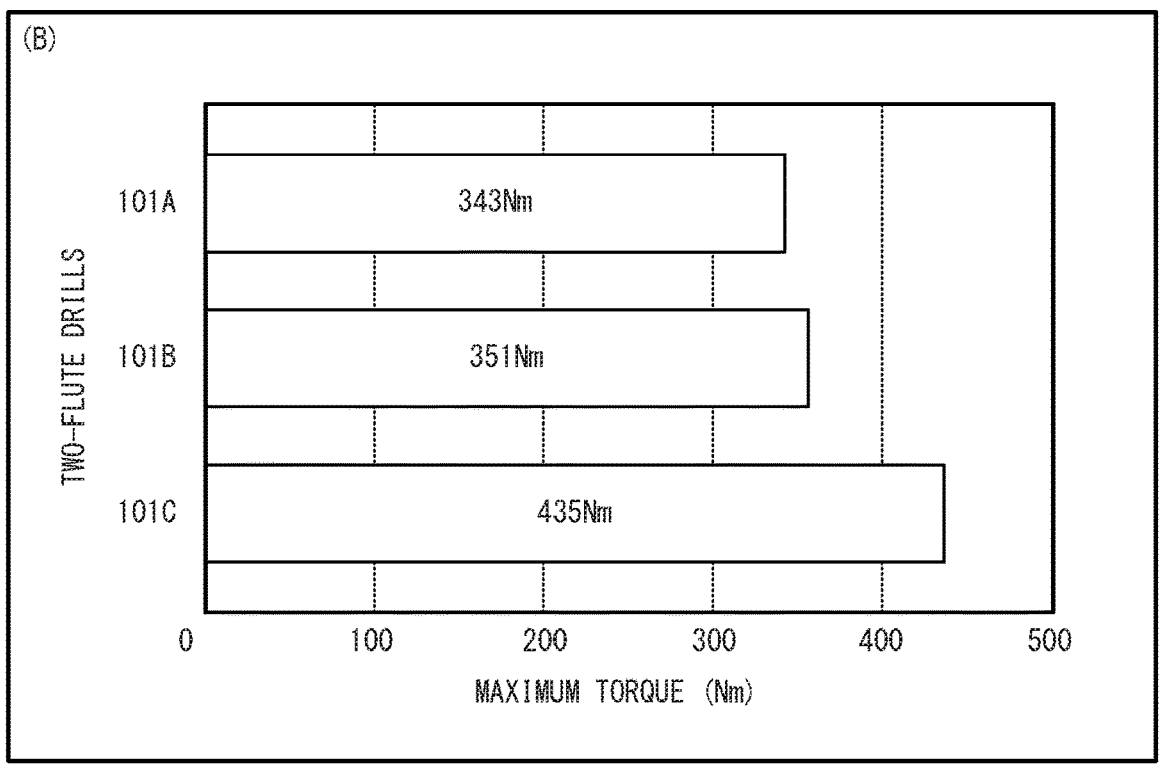

In the graph shown in FIG. 10 (A), the horizontal axis corresponds to the maximum thrust load when machining the workpiece under the conditions for the third test, and the vertical axis corresponds to each of the two-flute drills 101A, 101B and 101C. In the graph shown in FIG. 10 (B), the horizontal axis corresponds to the maximum torque when machining the workpiece under the conditions for the third test, and the vertical axis corresponds to each of the two-flute drills 101A, 101B and 101C.

As shown in FIG. 10 (A) and FIG. 10 (B), both the maximum thrust load and the maximum torque are smaller in the two-flute drill 101A than in the known two-flute drills 101B and 101C. In other words, the cutting resistance that acts on the drill at the time of machining is smaller in the two-flute drill 101A than in the known two-flute drills 101B and 101C. Thus, a result was obtained that the two-flute drill 101A was able to reduce and stabilize the cutting resistance in comparison to the known two-flute drills 101B and 101C.

Fourth Test

With respect to the two-flute drill 101 of the second embodiment and known two-flute drills, a fourth test was performed to verify differences in the cutting resistance corresponding to the feed amount caused by the shape difference of the gash portions 8. Specifically, moment-to-moment changes of the thrust load and the torque when machining the workpiece were measured with respect to each of two-flute drills 101D, 101G and 101J of the second embodiment in which the gash portions 8 were formed by the R portions 81 and the straight portions 82, known two-flute drills 101E, 101H and 101K in which the gash portions 8 were formed by the R portions 81 only, and known two-flute drills 101F, 101I and 101L in which the gash portions 8 were formed by the straight portions 82 only.

Conditions for the fourth test were as follows:
Outer diameter D: 10 mm
Workpiece: SCM440
Machining depth: 200 mm
Cutting speed: 100 m/min
Feed amount: 0.27 mm/rev, 0.35 mm/rev, 0.4 mm/rev
Other: guide hole used (inner diameter 10.03 mm, machining depth 10 mm)

Figure 11:
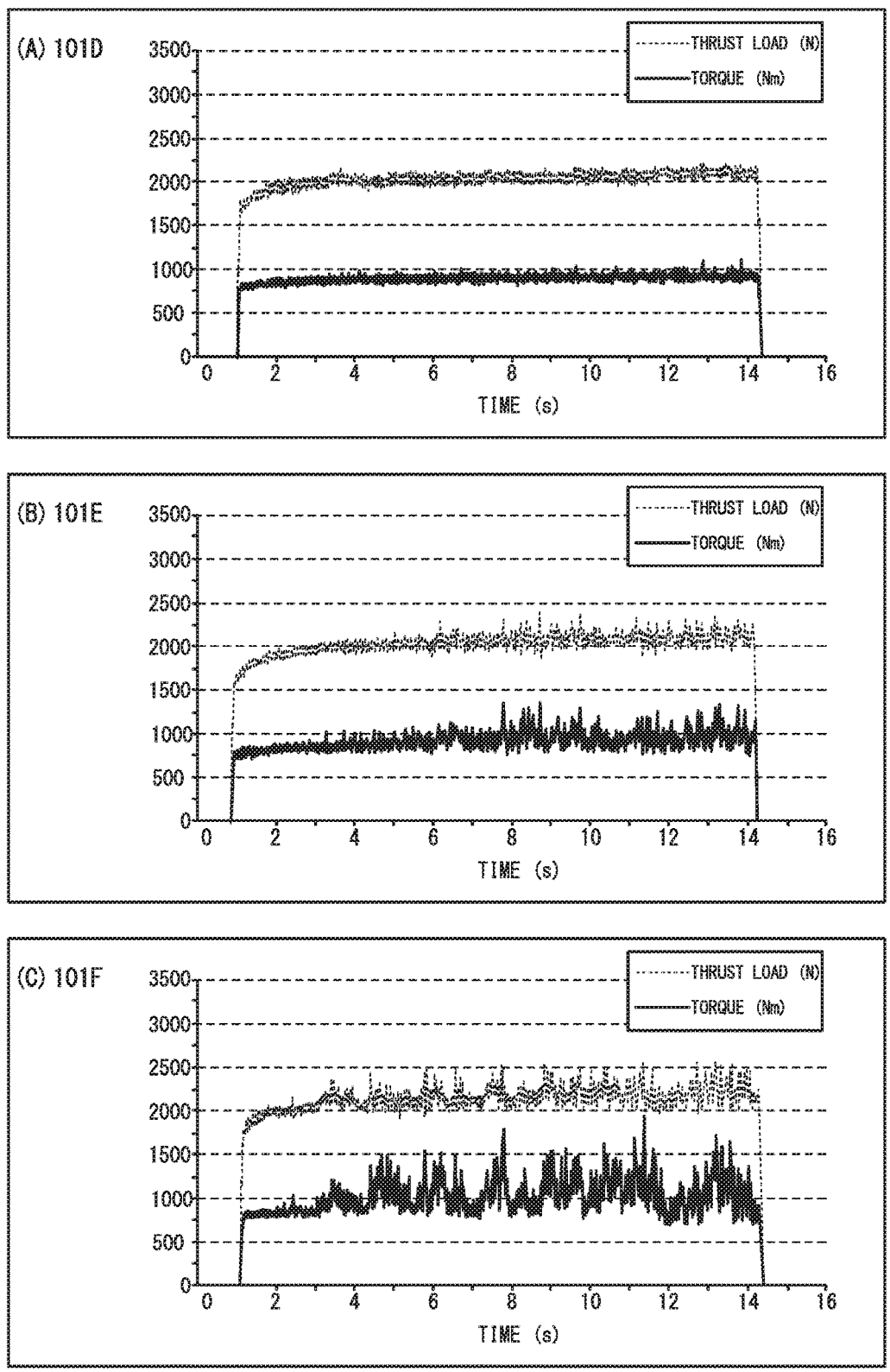
FIG. 11 shows fourth test results when a feed amount is 0.27 mm/rev, and includes graphs showing moment-to-moment changes of the thrust load and the torque of each of the two-flute drills.
Figure 12:
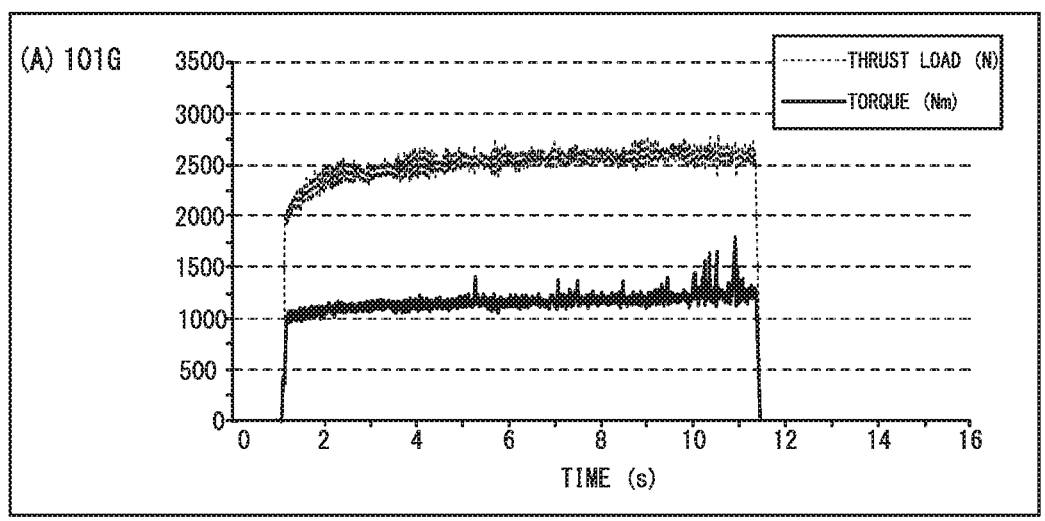
FIG. 12 shows the fourth test results when the feed amount is 0.35 mm/rev, and includes graphs showing the moment-to-moment changes of the thrust load and the torque of each of the two-flute drills.
Figure 12:
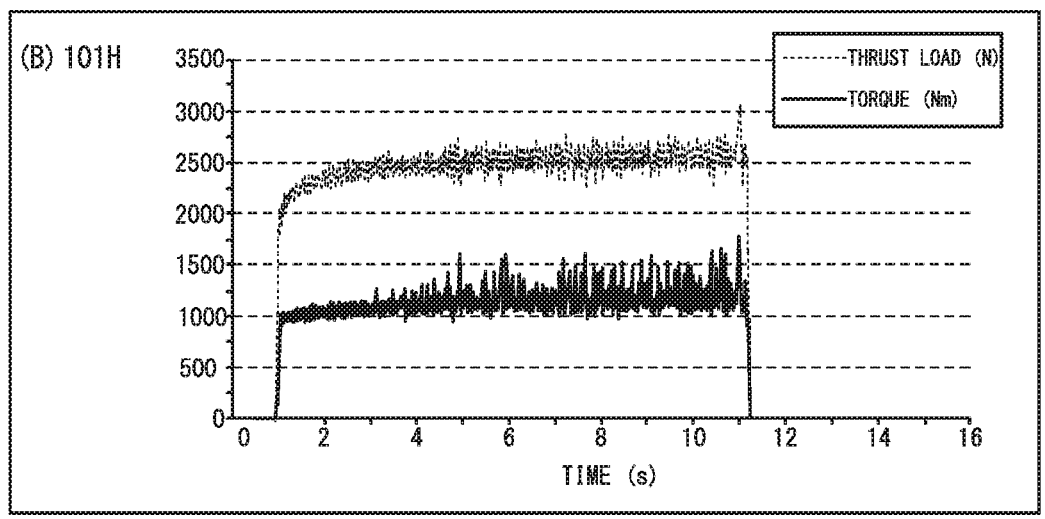
Figure 13:
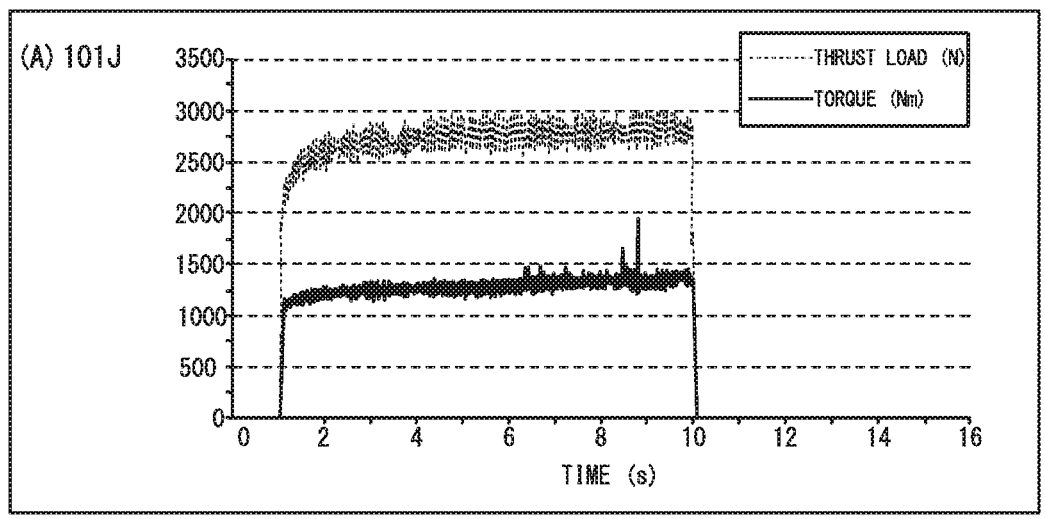
FIG. 13 shows the fourth test results when the feed amount is 0.40 mm/rev, and includes graphs showing the moment-to-moment changes of the thrust load and the torque of each of the two-flute drills.
Figure 13:
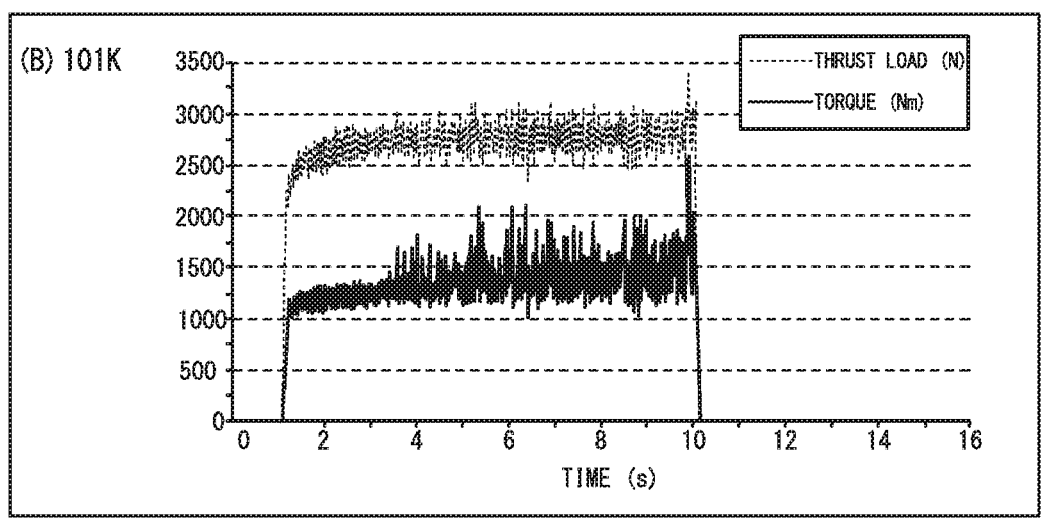

The graphs shown in FIG. 11 (A), FIG. 12 (A) and FIG. 13 (A) respectively show results of the fourth test performed using the two-flute drills 101D, 101G and 101J of the second embodiment. The graphs shown in FIG. 11 (B), FIG. 11 (C), FIG. 12 (B) and FIG. 13 (B) respectively show results of the fourth test performed using the known two-flute drills 101E, 101F, 101H and 101K. In each of the graphs shown in FIG. 11 to FIG. 13, the horizontal axis corresponds to time, and the vertical axis corresponds to the thrust load or torque when machining the workpiece under the above-described conditions for the fourth test. Specifically, in the graphs shown by broken lines, the vertical axis corresponds to the thrust load. In the graphs shown by solid lines, the vertical axis corresponds to the torque.

As shown in FIG. 11 to FIG. 13, fluctuations in each of the thrust load and the torque are smaller in the two-flute drills 101D, 101G and 101J than in the known two-flute drills 101E, 101F, 101H and 101K, regardless of the feed amount. In other words, variations over time in the thrust load and the torque (the cutting resistance) are more stable in the two-flute drills 101D, 101G and 101J than in the known two-flute drills 101E, 101F, 101H and 101K, regardless of the feed amount.

Figure 14:
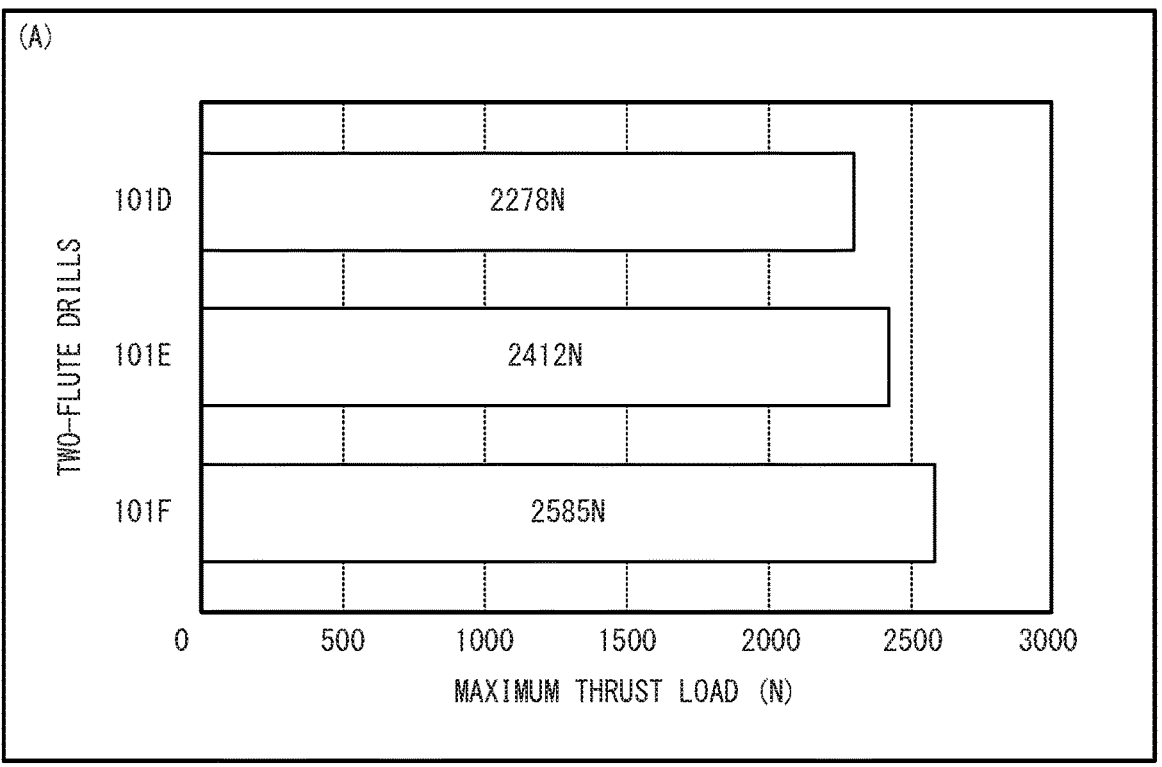
FIG. 14 shows the fourth test results when the feed amount is 0.27 mm/rev, and includes graphs showing the maximum thrust load and the maximum torque of each of the two-flute drills.
Figure 14:
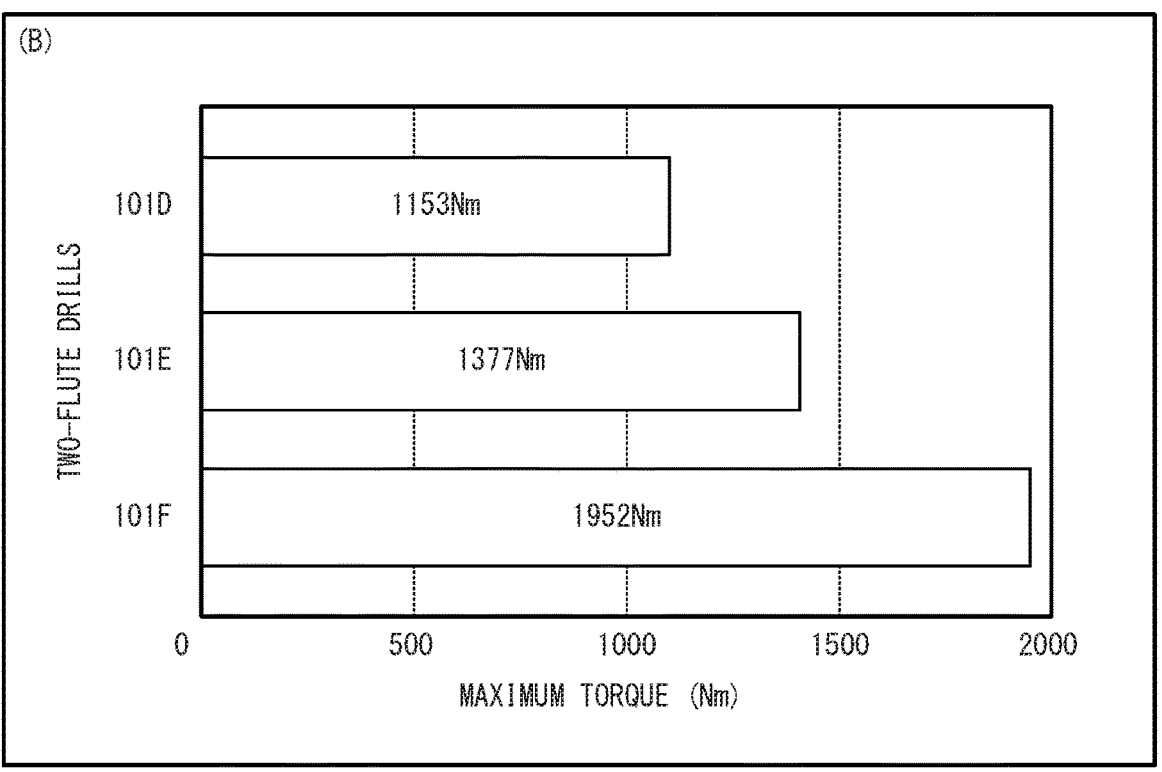

In the graphs shown in FIG. 14 (A) and FIG. 14 (B), the vertical axis corresponds to the two-flute drills 101D, 101E and 101F. In the graphs shown in FIG. 15 (A) and FIG. 15

(B), the vertical axis corresponds to each of the two-flute drills 101G 101H and 101I. In the graphs shown in FIG. 16 (A) and FIG. 16 (B), the vertical axis corresponds to each of the two-flute drills 101J, 101K and 101L. In the graphs shown in FIG. 14 (A), FIG. 15 (A) and FIG. 16 (A), the horizontal axis corresponds to the maximum thrust load when machining the workpiece under the above-described conditions for the fourth test. In the graphs shown in FIG. 14 (B), FIG. 15 (B) and FIG. 16 (B), the horizontal axis corresponds to the maximum torque when machining the workpiece under the above-described conditions for the fourth test.

Figure 15:
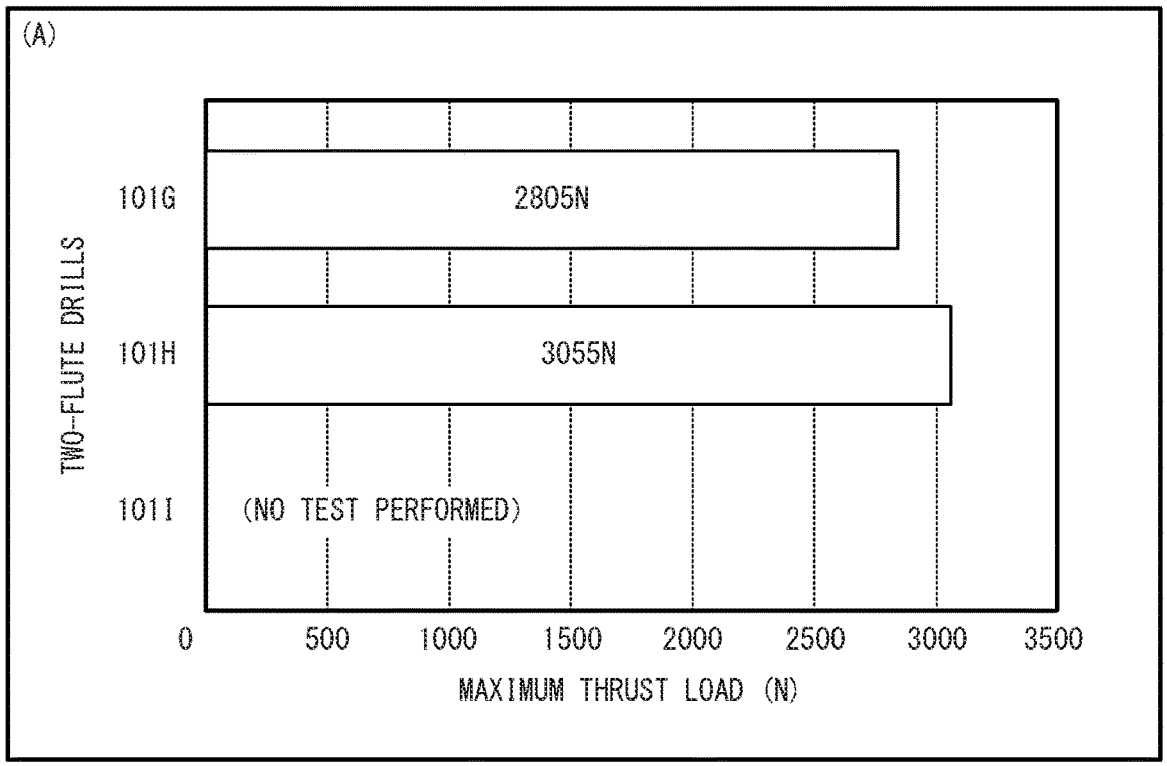
FIG. 15 shows the fourth test results when the feed amount is 0.35 mm/rev, and includes graphs showing the maximum thrust load and the maximum torque of each of the two-flute drills.
Figure 15:
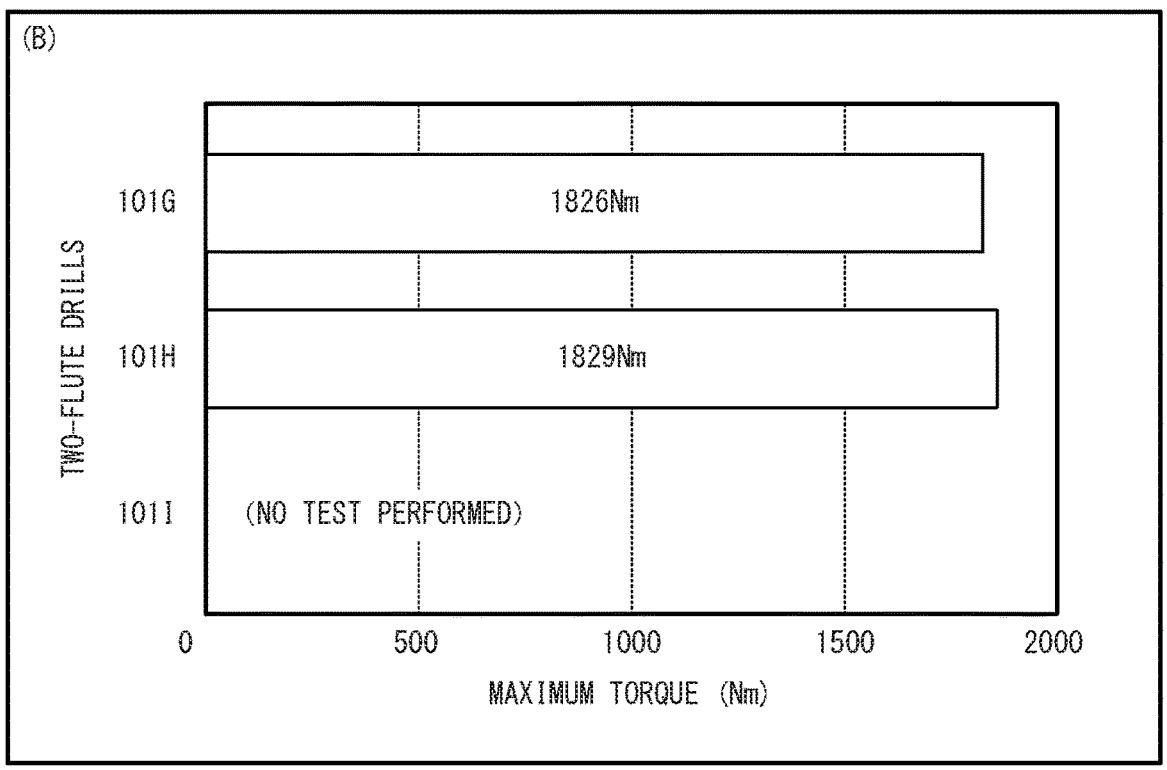
Figure 16:
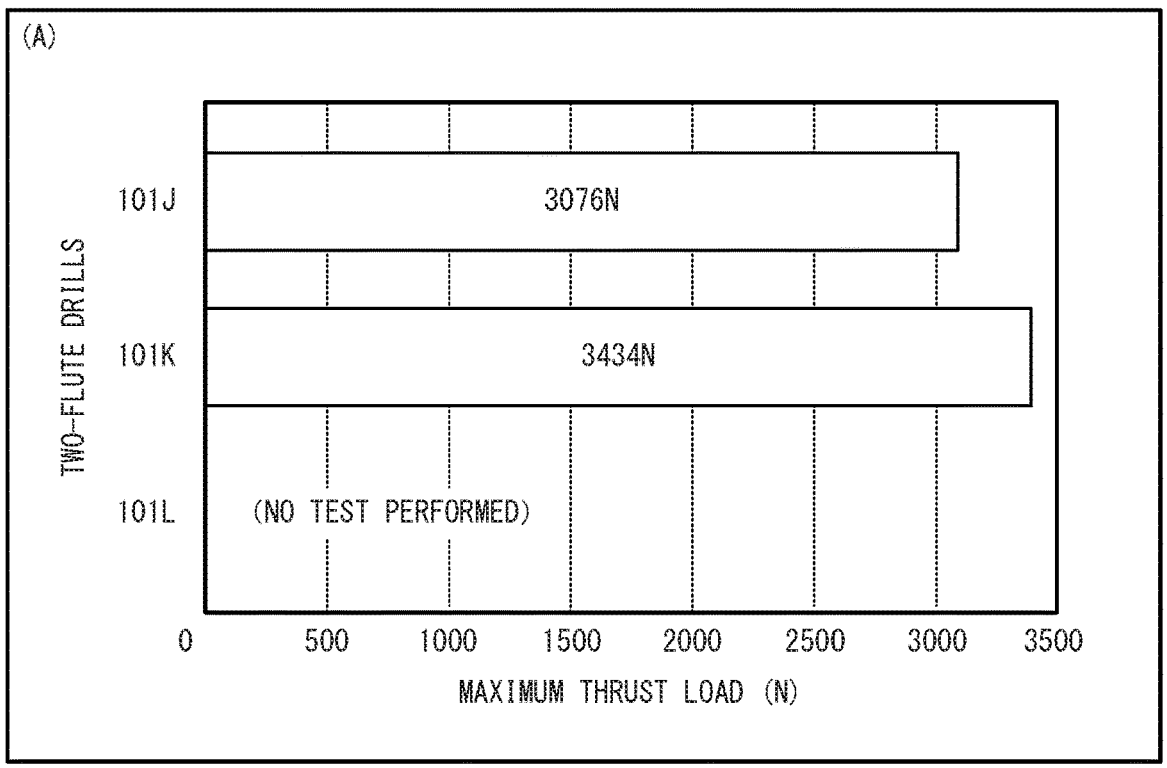
FIG. 16 shows the fourth test results when the feed amount is 0.40 mm/rev, and includes graphs showing the maximum thrust load and the maximum torque of each of the two-flute drills.
Figure 16:
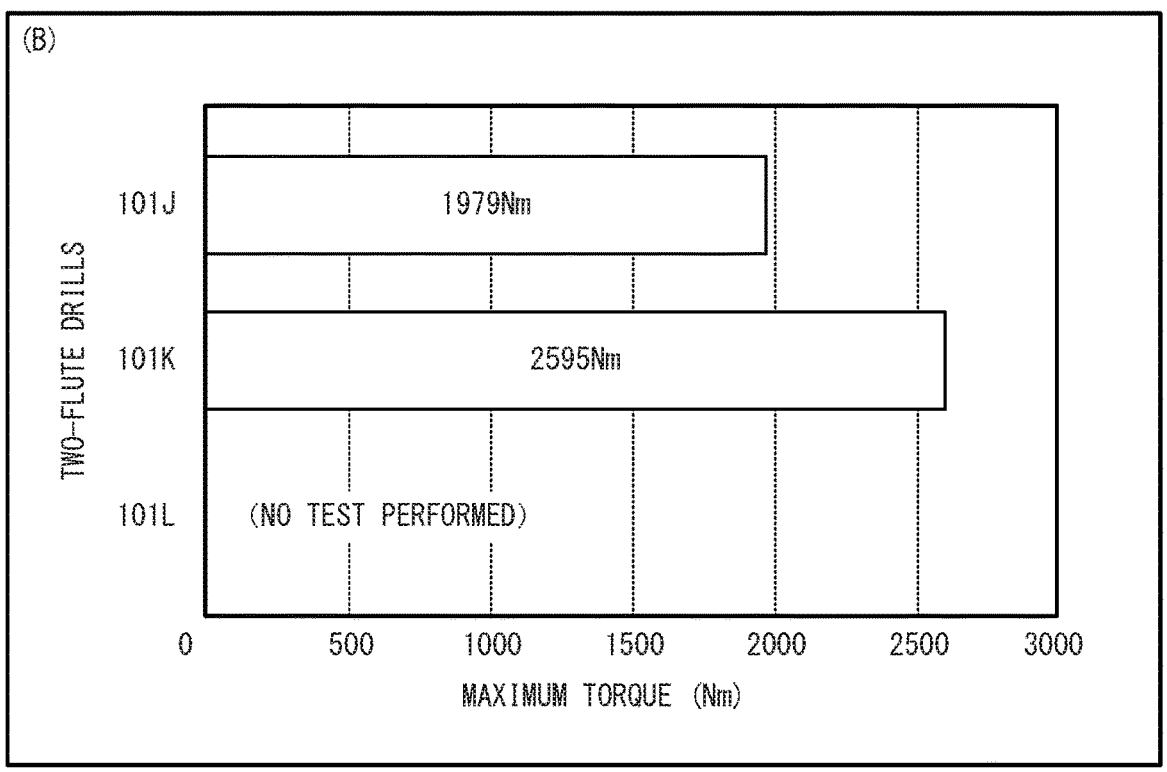

As shown in FIG. 14 to FIG. 16, the maximum thrust load and the maximum torque are smaller in each of the two-flute drills 101D, 101G and 101J than in the known two-flute drills 101E, 101F, 101H and 101K, regardless of the feed amount. In other words, the cutting resistance that acts on the drill at the time of machining is smaller in each of the two-flute drills 101D, 101G and 101J than in the known two-flute drills 101E, 101F, 101H and 101K. Thus, a result was obtained that, regardless of the feed amount, each of the two-flute drills 101D, 101G and 101J was able to reduce and stabilize the cutting resistance in comparison to the known two-flute drills 101E, 101F, 101H and 101K.

Note that, the fourth test was not performed with respect to each of the known two-flute drills 101I and 101L. This is because it is apparent that the variations over time in the thrust load and the torque are larger than in the two-flute drills 101G and 101J, and it is apparent that the maximum thrust load and the maximum torque are also larger than in the two-flute drills 101G and 101J.

The invention claimed is:

1. A drill comprising:
a body configured to extend along a shaft center;
a plurality of discharge grooves provided in a helical shape in an outer peripheral surface of the body from a leading end portion of the body toward a base end portion of the body wherein each of the discharge grooves is configured with two inner surfaces, one of which being a first inner surface facing a rotation direction of the body and the other of which being a second inner surface facing an opposite direction to the rotation direction;
a cutting edge provided on a ridge section between the first inner surface of the discharge groove and a flank on the leading end portion of the body;
a thinning edge configured to extend from an inner end of the cutting edge, in a radial direction of the body, toward an inner side in the radial direction; and
a gash portion provided on the second inner surface and including a curved portion in which a first ridge line between the second inner surface and the flank extends while curving toward the rotation direction, from an inner end of the thinning edge toward an outer side in the radial direction, and a straight portion in which a second ridge line between the second inner surface and the flank extends linearly from an outer end of the first ridge line in the radial direction toward the outer side in the radial direction, the second ridge line being configured to connect to the discharge groove further to the inner side in the radial direction than the outer peripheral surface of the body, wherein
a marginal portion is further provided adjacent to the straight portion at the outer side in the radial direction on the second inner surface, having a marginal ridge line that is formed between the flank and the second inner surface wherein the marginal ridge line is continuous to an outer end of the second ridge line and connected to a heel of the flank and the heel is a trailing edge of the outer peripheral surface corresponding to the flank in the rotation direction,
the marginal portion faces a different direction than the straight portion,
as seen from an axial direction in which the shaft center extends, the marginal ridge line is positioned at a predetermined angle, of which a value is positive, with respect to an imaginary extension of the second ridge line in the rotation direction, and
an arc length of the first ridge line is greater than a linear length of the second ridge line.

2. The drill according to claim 1, wherein
a distance from the shaft center to a position at which the second ridge line connects to the discharge groove is equal to or more than 30 percent and equal to or less than 45 percent of an outer diameter of the body.

3. The drill according to claim 1, wherein
as seen from the axial direction, an angle between the second ridge line and a tangential line at the outer end of the first ridge line in the radial direction is equal to or less than 20 degrees.

4. The drill according to claim 1, wherein
a boundary line between the curved portion and the straight portion extends toward the base end portion of the body such that the boundary line becomes away from the shaft center as approaching the base end portion, and
the straight portion is connected to the heel of the flank wherein the heel extends from the flank toward the base end portion of the body.

5. The drill according to claim 1, wherein
a length of the marginal ridge line is shorter than the arc length of the first ridge line.

6. A drill comprising:
a body configured to extend along a shaft center; and
a plurality of discharge grooves provided in a helical shape in an outer peripheral surface of the body from a leading end portion of the body toward a base end portion of the body, wherein the body has a plurality of flanks that are formed on the leading end portion of the body such that each of the discharge grooves is placed between a pair of the flanks adjacent each other, which are defined as first and second flanks, and is configured with two inner surfaces, one of which being a first inner surface facing a rotation direction of the body and the other of which being a second inner surface facing an opposite direction to the rotation direction, wherein
each of the discharge grooves is configured with
a cutting edge provided on a ridge section between the first inner surface of the discharge groove and the first flank on the leading end portion of the body;
a thinning edge configured on the first flank and to extend from an inner end of the cutting edge, in a radial direction of the body, toward an inner side in the radial direction; and
a gash portion provided on the second inner surface and including a curved portion in which a first ridge line between the second inner surface and the second flank extends while curving toward the rotation direction, and a straight portion in which a second ridge line between the second inner surface and the second flank extends linearly from an outer end of the first ridge line in the radial direction toward an outer side in the radial direction, the straight portion being configured to be at the inner side in the radial direction than the outer peripheral surface of the body, a circular arc groove that has a recessed curved surface facing the discharge groove, extending from the leading end portion of the body toward the base end portion, wherein a leading curved ridge line of the circular arc groove, which is located on the leading end portion of the body, has a diameter that is smaller than a diameter of the first ridge line of the curved portion, and that is formed between an inner end of the thinning edge and an inner end of the first ridge line of the curved portion in the radial direction such that the cutting edge, the thinning edge, the leading curved ridge line of the circular arc groove, the first ridge line of the curved portion and the second ridge line of the straight portion are continuously connected in this order, a marginal portion is further provided adjacent to the straight portion at the outer side in the radial direction on the second inner surface, having a marginal ridge line that is formed between the second flank and the second inner surface wherein the marginal ridge line is continuous to an outer end of the second ridge line and connected to a heel of the second flank and the heel is a trailing edge of the outer peripheral surface corresponding to the second flank in the rotation direction, the marginal portion faces a different direction than the straight portion, as seen from an axial direction in which the shaft center extends, the marginal ridge line is positioned at a predetermined angle, of which a value is positive, with respect to an imaginary extension of the second ridge line in the rotation direction.

7. The drill according to claim 6, wherein a length of the marginal ridge line is shorter than the arc length of the first ridge line.

\* \* \* \* \*